United States Patent
Andrios et al.

[11] Patent Number: 6,143,230
[45] Date of Patent: Nov. 7, 2000

[54] METHOD OF MAKING PLASTIC HOODS AND DIVIDERS

[75] Inventors: John Andrios; Dathan Kerber, both of Geneseo, Ill.; Brian Koesters, Bettendorf, Iowa

[73] Assignee: Case Corporation, Racine, Wis.

[21] Appl. No.: 09/305,708

[22] Filed: May 5, 1999

[51] Int. Cl.[7] .......................... B29C 33/56; B29C 41/04
[52] U.S. Cl. .................. 264/306; 264/310; 264/338; 425/429; 427/135
[58] Field of Search ...................... 264/310, 311, 264/338, 302, 306; 425/429; 427/135

[56] References Cited

U.S. PATENT DOCUMENTS

| | | |
|---|---|---|
| 3,314,639 | 4/1967 | Barnett ..................... 264/310 |
| 3,759,021 | 9/1973 | Schreiner et al. . |
| 3,982,384 | 9/1976 | Rohweder et al. . |
| 4,167,382 | 9/1979 | Freedman et al. ..................... 425/256 |
| 4,403,467 | 9/1983 | Baugh . |
| 4,446,682 | 5/1984 | Jennen et al. . |
| 4,493,181 | 1/1985 | Glendenning et al. . |
| 4,502,270 | 3/1985 | Shupert . |
| 4,538,404 | 9/1985 | Heimark, Jr. et al. . |
| 4,729,212 | 3/1988 | Rabitsch . |
| 4,810,527 | 3/1989 | Geary, Jr. et al. ..................... 427/54.1 |
| 4,835,954 | 6/1989 | Enzmann . |
| 4,865,787 | 9/1989 | Vallance et al. ..................... 264/101 |
| 4,899,526 | 2/1990 | Harris . |
| 4,907,403 | 3/1990 | Jones . |
| 4,976,910 | 12/1990 | Gatley et al. . |
| 5,174,101 | 12/1992 | Rabitsch . |
| 5,195,309 | 3/1993 | Mossman . |
| 5,453,230 | 9/1995 | McClellan et al. ..................... 264/45.7 |
| 5,612,066 | 3/1997 | Swenson . |
| 5,711,905 | 1/1998 | Behl . |
| 5,776,399 | 7/1998 | Swenson ................... 264/219 |

*Primary Examiner*—Jill L. Heitbrink
*Assistant Examiner*—Dae Young Lee
*Attorney, Agent, or Firm*—Brinks Hofer Gilson & Lione

[57] ABSTRACT

Plastic hoods and dividers are provided for use with row crop heads. The hoods and dividers are single walled and self-supporting. The single-walled hoods and dividers are preferably manufactured through a rotational molding process wherein a non-stick coating, such as polytetrafluoroethylene, is attached to portions of the mold.

4 Claims, 6 Drawing Sheets

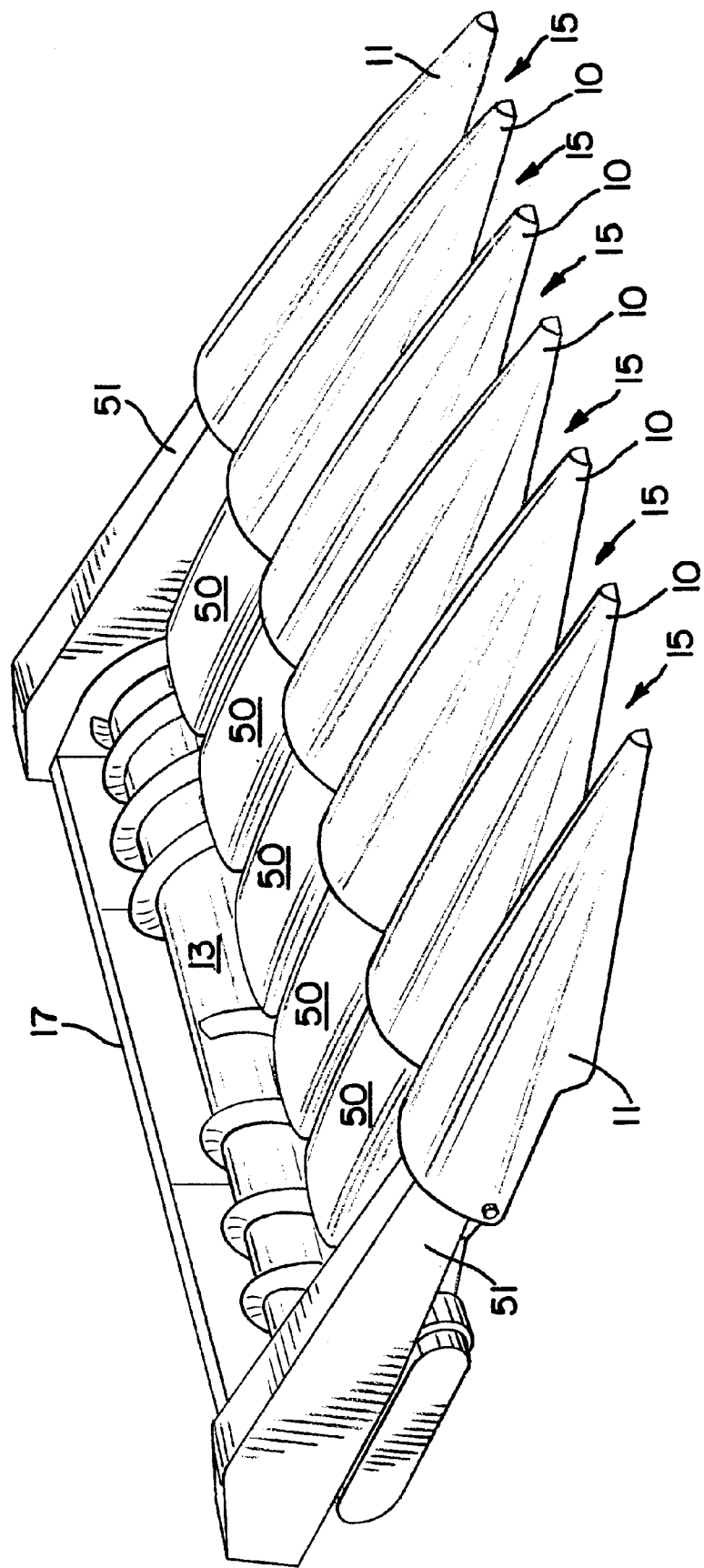

METHOD OF MAKING PLASTIC HOODS AND DIVIDERS

BACKGROUND OF THE INVENTION

Combines are used to harvest agricultural crops by being driven through the crops and sequentially cut the crop, separate the desired crop from the undesired waste, store the crop, and discard the waste. A head is mounted to the front of a combine to gather the crop and feed the crop into the combine for processing. Each type of head is designed to be used with a particular type of crop. One such type of crop is a row crop, such as corn.

Row crop heads include a plurality of dividers. The dividers are converging members that are aligned parallel and adjacent to one another. Each divider proceeds between a pair of rows and each pair of adjacent dividers straddles a row and directs the crop in that row into the gap between adjacent dividers. Extending rearward from the dividers are hoods that are virtual extensions of the dividers. Between adjacent hoods are ear strippers that remove the ears from the stalks and guide the ears into the processing unit of the combine. The combine is driven such that each divider is located between a row of the crop, thereby guiding the crop into the gatherers and facilitating processing of the crop.

Large combines are desirable because they are able to harvest and process more crop at a faster rate. As a result, a farmer's efficiency and total harvest are increased. One way to increase the productivity of a combine is to make the head wider such that it cuts a wider path through the field and a greater volume of crop is taken into the combine. However, as the heads get wider, they also become more and more massive. In addition, the extra weight of the head is further magnified through leverage because the heads are mounted on the front of the combine by a feeder housing that extends in front of the wheel base, thereby creating a large moment arm. As a result of these substantial forces, the assembly that secures the head to the combine must be commensurately stronger and heavier. Overall, increasing the width of the head increases the amount of power that is necessary to move and operate the larger head. Consequently, it is highly desirable to reduce the weight of the head while maintaining the requisite size, strength and effectiveness.

The hoods and dividers on the heads are commonly made of sheet metal and supported by a steel frame. These steel components add significantly to the weight of the head. One way of reducing the weight of the head is through the use of lighter weight plastic hoods and dividers. For example, U.S. Pat. No. 5,195,309 to Mossman is directed to double-walled, self-supporting plastic crop dividers. Also, U.S. Pat. No. 4,403,467 to Baugh describes a row divider with a flexible plastic sheath that is mounted upon, and supported by, a steel sub-frame. There exists a need in the field for a plastic hood and a plastic divider that create a reduced weight head without the use of a double-walled structure, such as described in the Mossman patent, or a separate support system as described in the Baugh patent.

BRIEF SUMMARY OF THE INVENTION

Hoods and dividers for use in a row crop head are provided. The hoods are substantially semi-cylindrical and the dividers are substantially semi-conical. The hoods and dividers comprise a single-walled, self-supporting plastic body. Preferably, the body is formed using a rotational molding tool and a portion of the tool is covered with a polytetrafluoroethylene coating.

A method of making hoods and dividers for use in a row crop head is also provided. The method comprises the following steps. A rotational molding tool is provided wherein the tool comprises an upper portion and a base portion. The upper portion is made of metal and shaped such that it defines the shape of the hood or divider. The base portion is at least partially coated with polytetrafluoroethylene. An amount of plastic is supplied in granular form into the tool and the tool is heated so as to liquefy the plastic. The tool is moved in a plurality of directions such that the plastic contacts the surface of the tool. The plastic is then removed from the tool.

A rotational molding tool is also provided. The tool comprises an upper portion and a base portion. The upper portion is made of metal and shaped such that it defines the shape of a hood or divider for use on a row crop head. The tool is at least partially coated with a non-stick polymer.

The forgoing and other features and advantages of this invention will become further apparent from the following detailed description of the presently preferred embodiments, read in conjunction with the accompanying drawings.

BRIEF DESCRIPTION OF THE DRAWINGS

FIG. 1 is a front perspective view of a corn head on which the hoods and dividers of the present invention may be used;

DETAILED DESCRIPTION OF THE PREFERRED EMBODIMENTS OF THE INVENTION

Figure 3:
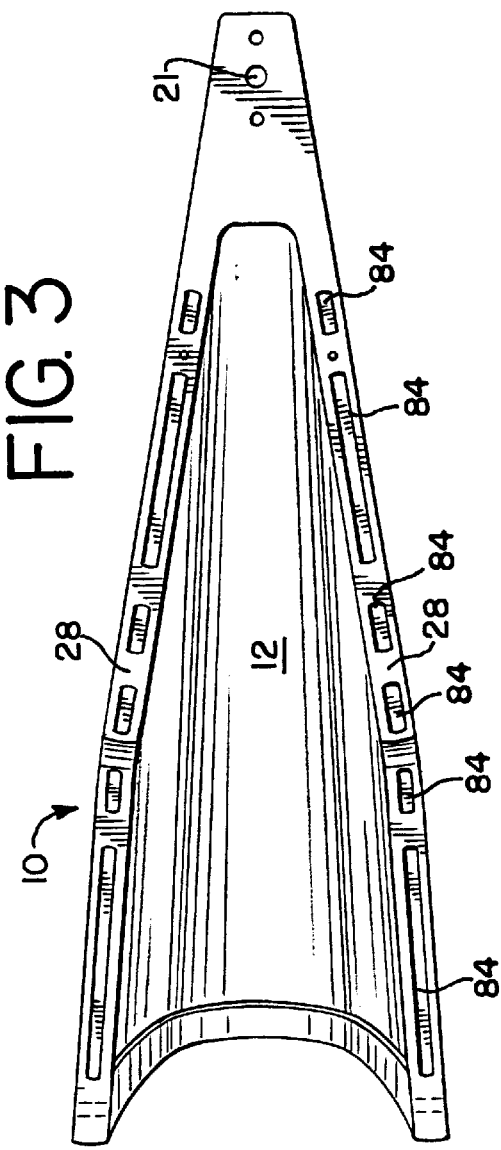
FIG. 3 is a bottom view of an inner divider of the present invention.

The present invention is directed to hoods and dividers that may be used on a row crop head for a combine. The hoods and dividers of the present invention may be used with any conventional row crop head. The design and operation of such row crop heads are well known in the art. For example, U.S. Pat. No. 5,195,309 to Mossman, U.S. Pat. No. 4,538,404 to Heimark, Jr. et al., U.S. Pat. No. 4,446,682, U.S. Pat. No. 4,403,467 to Baugh, and U.S. Pat. No. 3,982,384 to Rohweder et al. each discuss the design and operation of row crop heads and are hereby incorporated by reference in their entirety. The hoods and/or dividers of the present invention may be used in any row crop head that utilizes a divider-type mechanism to guide crop into the combine.

In a preferred embodiment, the hoods and dividers of the present invention are used with a corn head. An example of a corn head is shown in FIG. 1. The head consists of dividers 10, 11, hoods 50, 51, an auger 13 and a frame 17. The outer (end row) dividers 11 are attached to the frame 17 at opposing ends of the frame 17. Rearward of outer dividers 11 are outer hoods 51. Spaced along the frame 17 are the inner (center row) dividers 10. Rearward of the inner dividers 10 are the inner hoods 50. Disposed between adjacent dividers 10, 11 are the ear strippers 15. The head is used to harvest a row crop such that dividers 10, 11 are driven between individual rows of crop, thereby forcing the crop between the dividers 10, 11. The ears are removed by the strippers (not shown) which are adjacent the hoods 50 and the crop falls near the auger 13. The auger 13 moves the crop from each end of the head into the center of the head where a conveyer mechanism moves the crop through a feeder housing into the combine.

The dividers 10,11 are shaped to track between the rows and guide a row crop into the ear strippers 15. In a preferred embodiment, the dividers 10, 11 are semi-conical. The dividers 10, 11 have a wide semi-circular base and preferably taper down in height and width to a point. Rearward of, and overlapping with, the dividers 10,11 are the hoods 50, 51. The hoods 50 are preferably semi-cylindrical.

Figure 4:
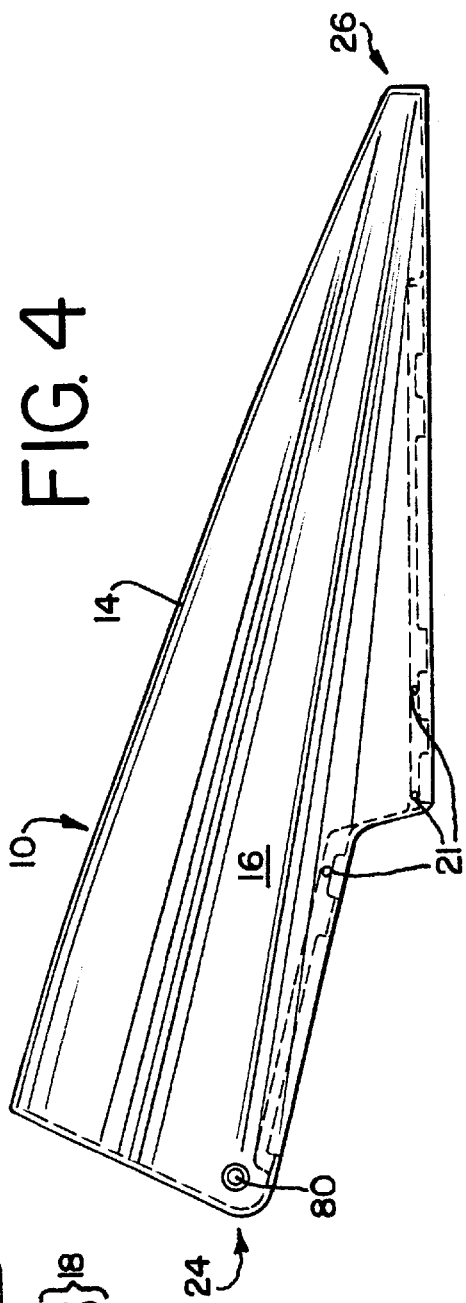
FIG. 4 is a side view of an inner divider of the present invention.
Figure 2:
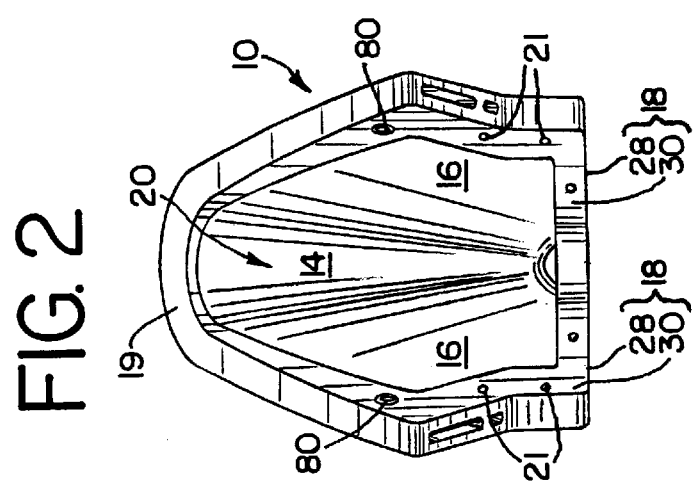
FIG. 2 is a rear view of an inner divider of the present invention.

FIGS. 2–4 depict a preferred embodiment of the inner divider 10 of the present invention. Divider 10 is generally formed from a single wall 12 formed to define a semi-conical deflector including top portion 14, side walls 16, side wall flanges 18, and rear wall flange 19. Top portion 14 and side walls 16 define an open cavity 20 below and between top portion 14 and side walls 16. Side wall flanges 18 are generally L-shaped and extend along an inner periphery of side walls 16 from a first end 24 towards a second end 26. Side wall flanges 18 generally include a horizontal lip 28 and a vertical lip 30. Rear wall flange 19 is a generally vertical lip extending downwardly and inwardly from top portion 14 and extending inwardly and forwardly from side walls 16 at rear end 24. Outer divider 11 is not shown, but is of substantially similar construction.

Figure 6:
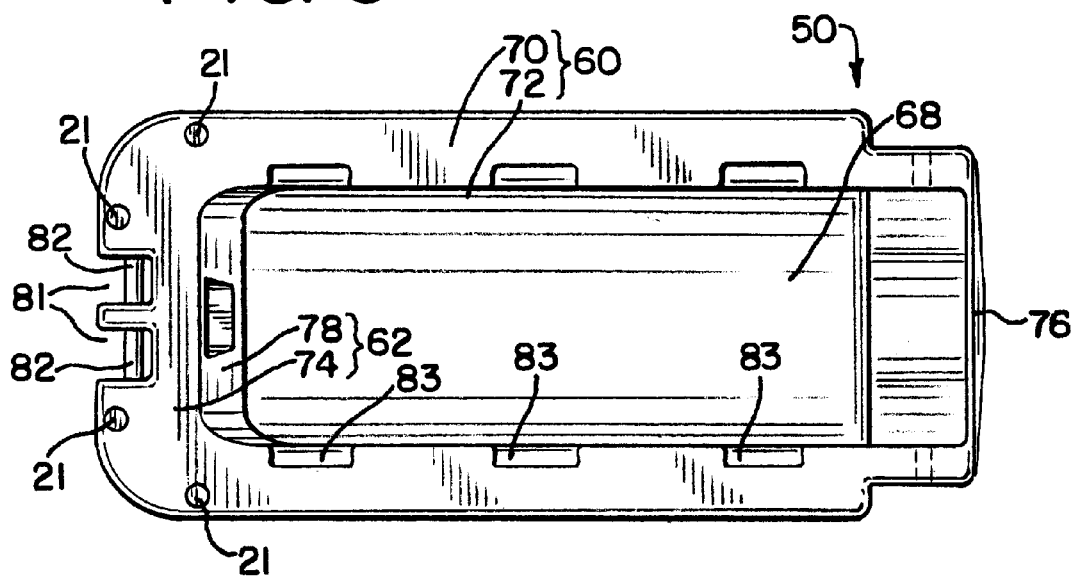
FIG. 6 is a bottom view of an inner hood of the present invention.

As shown in FIGS. 4 and 6, inserts 21 may be molded into the dividers 10,11 and/or hoods 50, 51. The inserts 21 are capable of securing a bracket (not shown) that attaches the dividers 10, 11 and/or hoods 50, 51 to the frame. The insert 21 is a female threaded member, similar to a nut. With respect to the dividers 10,11, the insert 21 is adapted to accommodate a bracket. The bracket keeps the dividers 10, 11 raised off of the ground so that they do not "nose-dive" into the field. This bracket extends inwardly into the cavity 20 such that the when the dividers 10,11 are lowered from a raised position the bracket contacts the frame and prevents the divider from contacting the ground. With respect to the hoods 50, 51 the insert 21 is adapted to accommodate a bracket (not shown) which secures the hoods 50, 51 to the frame 17.

Figure 5:
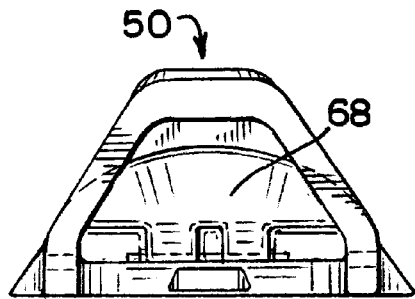
FIG. 5 is a front view of an inner hood of the present invention.
Figure 7:
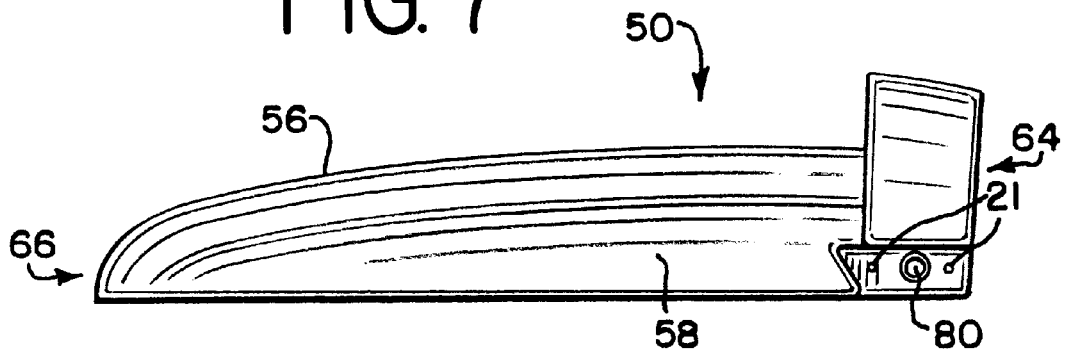
FIG. 7 is a side view of an inner hood of the present invention.

FIGS. 5–7 illustrate a preferred embodiment of an inner hood 50 of the present invention. Hood 50 is a generally semi-cylindrical deflector configured for covering and enclosing row unit gathers. Top portion 56 and side walls 58 extend from front end 64 to rear end 66 and define a lower open cavity 68 underneath and between top portion 56 and side walls 58, respectively. Side wall flanges 60 extend along an inner peripheral edge of side walls 58 between front end 64 and rear end 66, and include a generally horizontal lip 70 and vertical lip 72. Horizontal lip 70 extends inwardly from side walls 58. Vertical lip 72 extends substantially vertically from horizontal lip 70. Rear wall flange 62 includes horizontal lip 74, and vertical lip 78. Vertical lip 76 extends along front end 64. Horizontal lip 74 extends along rear end 66. Vertical lip 78 extends generally vertically, preferably at about a 45-degree angle, upward from horizontal lip 74.

Overall, the rear end 66 of the hood preferably mounts to a combine head frame 17. Molded into the rear end 66 of the hood are gaps 81. Disposed within and bridging gaps 81 are support rods 82. Support rods 82 are preferably made of metal and provide a solid support means for rotatably securing the rear end of the hood to the combine head frame 17.

In a preferred embodiment, the front end 64 of the hood pivotally supports divider 10. Both the front end 64 of the hood and the rear end 24 of the divider preferably include metal sleeves 80. Metal sleeves 80 are disposed in, and penetrate trough, the side walls 16 of the divider and the side walls 58 of the hood. The metal sleeves 80 are preferably located such that when the front end 64 of the hood is located under the rear end 24 of the divider, the sleeves 80 are in axial alignment. It is thereby possible for a pole, rod, or the like, to pass through the sleeves so as to rotatably secure the hood 50 to the divider 10.

Figure 8:
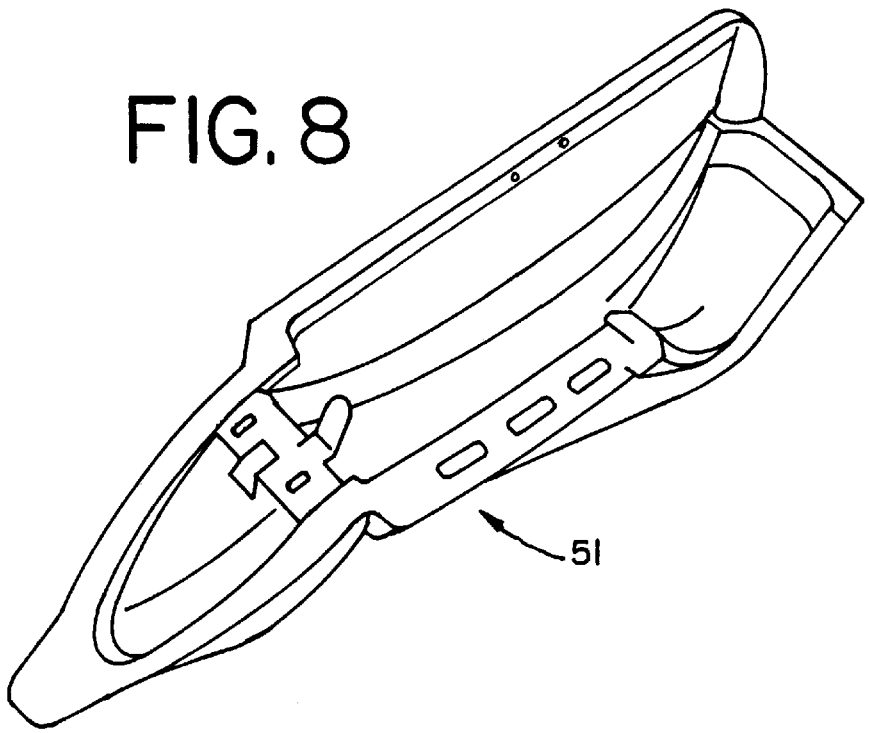
FIGS. 8 and 9 are bottom perspective views of an outer hood of the present invention.
Figure 9:
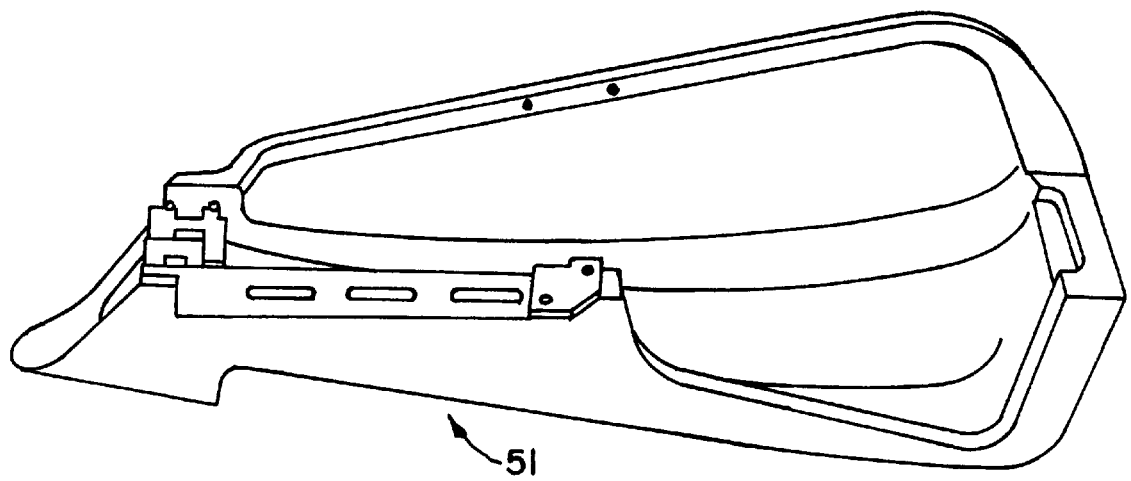

FIGS. 8 and 9 show a preferred embodiment of the outer hood 51 of the present invention. Outer hoods 51 are of substantially similar construction as inner hoods 50, described above, and may be manufactured according to the same techniques as inner hoods 50, described below.

In a preferred embodiment, the hoods 50, 51 and dividers 10, 11 have features that facilitate a more rigid product. Hoods 50, 51 include support surfaces 83 or "kiss-offs." Support surfaces 83 are molded indentations in the side wall flanges 60 and rear wall flange 62. The indentations that comprise support surfaces 83 are sufficiently deep so that the support surfaces are adjacent to, and preferably touching, the top portion 56. In an alternative embodiment, the support surfaces 83 are integral with the top portion 56. This construction facilitates a more rigid hood 50, 51. With respect to the dividers, the dividers 10, 11 preferably have stiffener ribs 84 that facilitate a more rigid divider 10, 11. Stiffener ribs 84 are elongated indentations in the side wall flanges 18 of the dividers 10, 11.

Preferably, the hoods 10, 11 and dividers 50 of the present invention are made of polyethylene. However, any lightweight plastic material that is of sufficient strength is within the scope of this invention. More preferably, linear low density polyethylene ("LLDPE") or very low density polyethylene ("VLDPE") are used. In particular, specialty polyethylene resins such as Petrothene® and Microthene®, available from Millennium Petrochemicals of Cincinnati, Ohio, or Rotolite™ S and Rotolite™ F (collectively the "Rotolite™ OS system") available from WedTech Inc. of Brantford, Ontario, may be used. Use of Petrothene® and Microthene® or Rotolite™ S and Rotolite™ F facilitate a foamed construction in a single rotational molding operation.

The hoods and dividers of the present invention are single-walled. Previously, plastic hoods and dividers required supplemental means in order to support the hood or divider. Such hoods or dividers required either a double walled construction or a separate sub-frame in order to impart sufficient rigidity to support the hood or divider. According to the present invention, a hood or divider may be formed wherein a single wall is sufficient internal support.

The single wall construction is facilitated by a novel method of manufacturing. The hoods and dividers are roto molded by a specially adapted rotational molding ("roto mold") tool.

Generally, a roto mold tool consists of multiple metal parts. The parts are configured such that when assembled together the tool has an interior cavity with the shape of the desired product. Powdered or granulated plastic resin is placed in the interior cavity of the tool. The tool is placed in an oven wherein the plastic is melted. The tool is rotated in all three dimensions so as to coat the interior of the cavity and the plastic adheres to the metal walls. The tool is then cooled and disassembled and the finished product is removed. Because the cavity of the tool is enclosed, the prior art product was necessarily a double walled structure.

A roto mold tool of the present invention uses a non-stick material to coat specific surfaces of the mold. The plastic is unable to stick to the coated surfaces, thereby creating an open space wherever the mold is coated with the non-stick material. In a preferred embodiment, the mold is selectively coated with polytetrafluoroethylene (PTFE or "TEFLON®") to create a single walled product in accordance with this invention. In addition to TEFLON®, other materials may be used such as perfluoroalkoxy resins, fluorinated ethylene propylene resins or other polymeric or non-polymeric coatings to which plastic is unable to adhere and which may be affixed to the surface of a mold.

Figure 10:
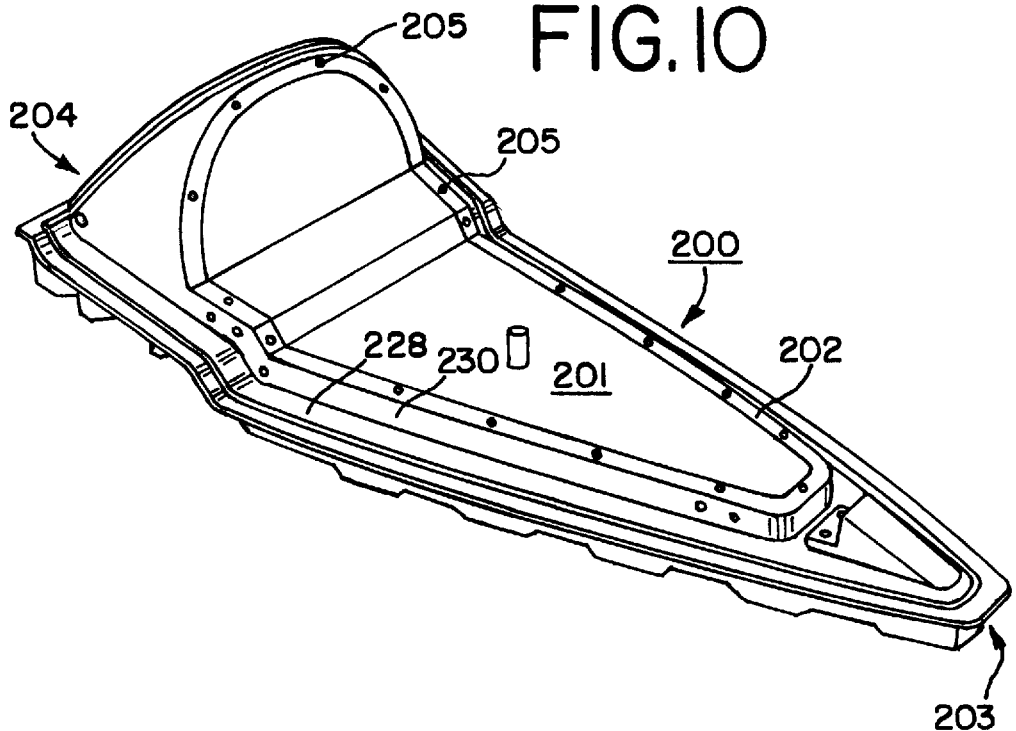
FIG. 10 is a top perspective view of a bottom portion of a roto mold tool of the present invention for making inner dividers.
Figure 11:
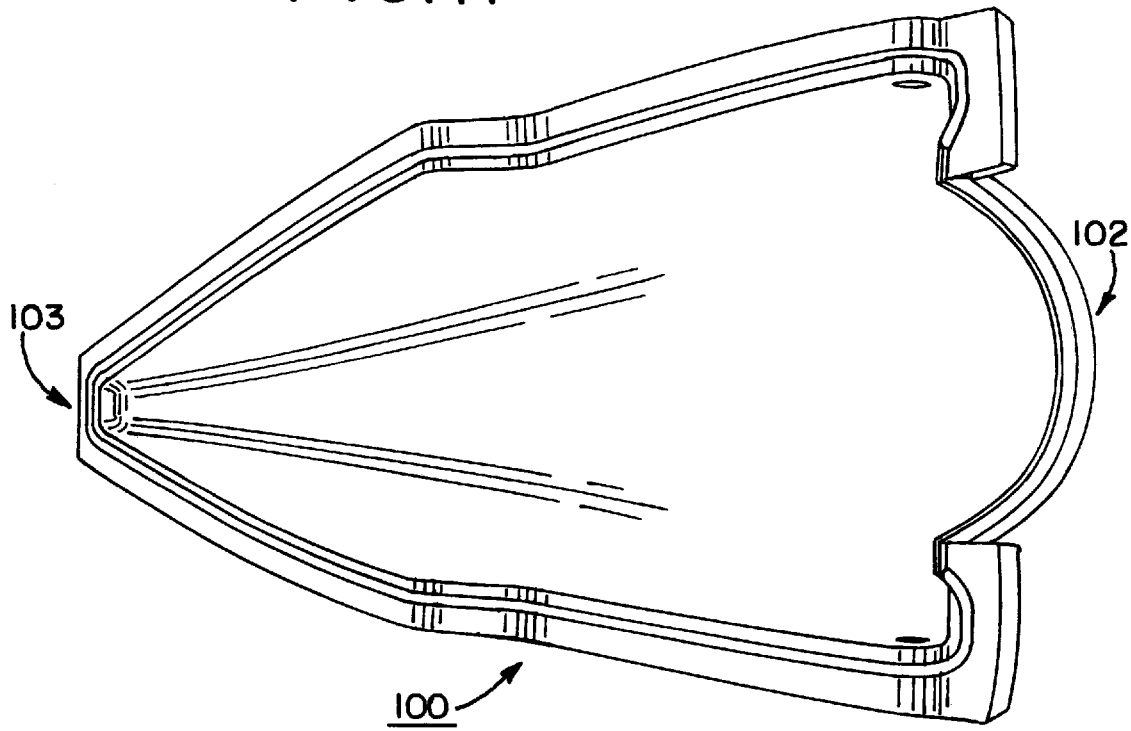
FIG. 11 is a bottom perspective view of an upper portion of a roto mold tool of the present invention for making inner dividers.
Figure 12:
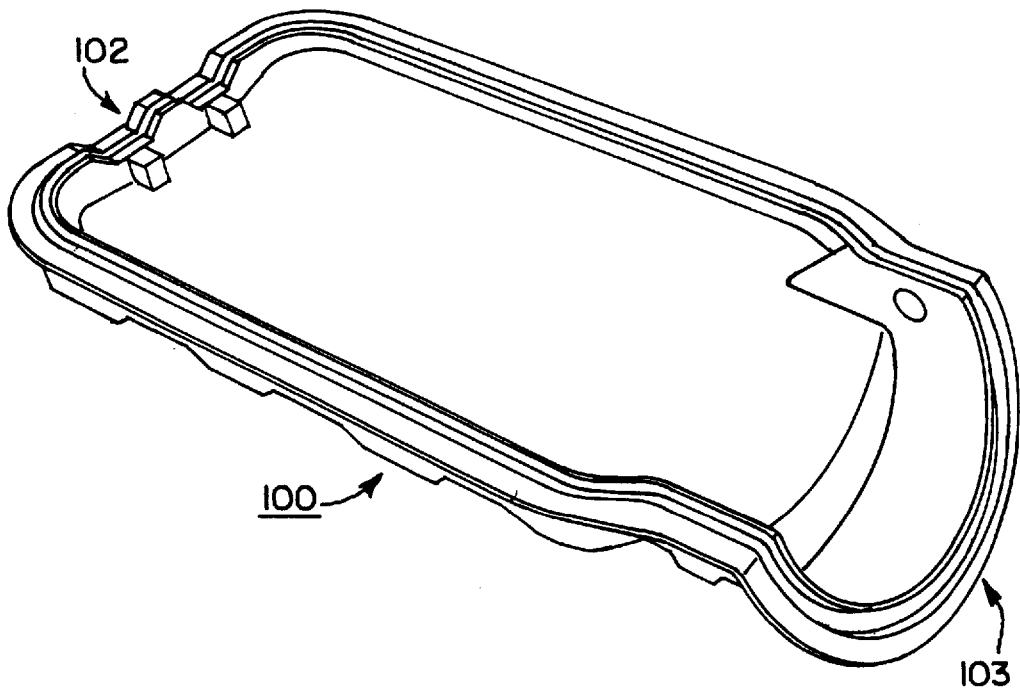
FIG. 12 is a bottom perspective view of an upper portion of a roto mold tool of the present invention for making inner hoods.
Figure 13:
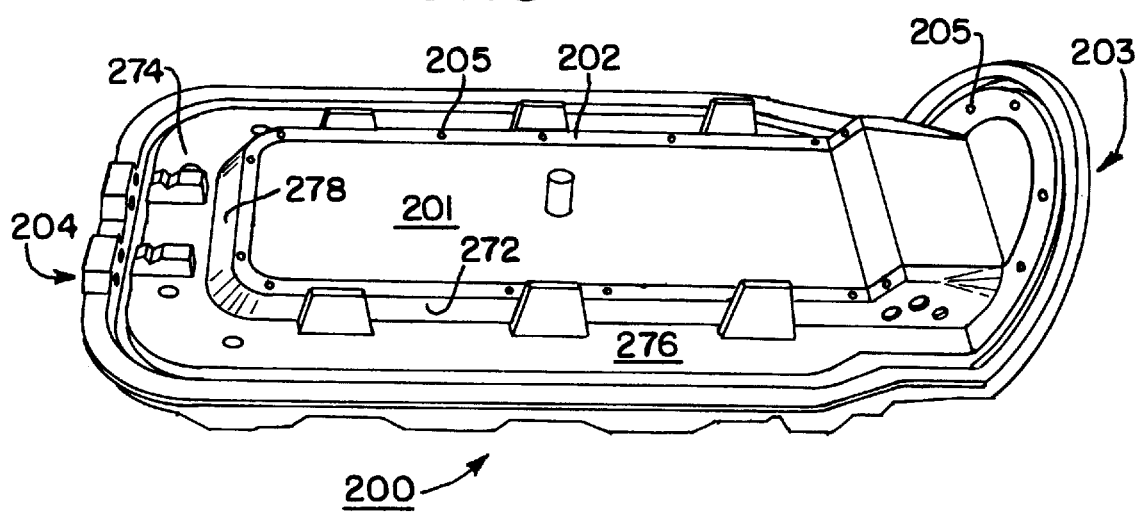
FIG. 13 is a top view of a base portion of a roto mold tool of the present invention for making inner hoods.

Preferred roto mold tools of the present invention are shown in FIGS. 10–13. The mold shown in FIGS. 10 and 11 is used to construct the inner dividers 10 of the present invention. The mold shown in FIGS. 12 and 13 are used to construct the inner hoods 50 of the present invention. The tools consists of two parts: an upper portion 100 (FIGS. 11 and 12) and a base portion 200 (FIGS. 10 and 13). The upper portion 100 has the shape of the part to be constructed. The upper portion 100 is secured to the base portion 200 in a "clam-shell" arrangement. The upper portion 100 has an upper rear end 102 and an upper front end 103.

The base portion 200 is substantially flat and has an outline that corresponds approximately with the outline of the upper portion 100. The base portion has a base rear end 204 and a base front end 203 that correspond with the upper rear end 102 and upper front end 103, respectively, of the upper portion 100. The base portion 200 of the inner hood 50, FIG. 13, has edges 274, 272, 276, and 278 that define and create horizontal lip 74 and vertical lips 72,76 and 78 of the inner hood 50, as described above. Similarly, the base portion 200 of the inner divider 10, FIG. 10, has edges 228 and 230 that define and create horizontal lip 28 and vertical lip 30 of the inner divider 10 described above.

As shown in FIGS. 10 and 13 the base portion 200 is preferably covered with a TEFLON® sheet 201. The TEFLON® sheet 201 is preferably attached to the base portion 200 with a TEFLON® coated steel strip 202. The steel strip 202 is in turn secured to the base portion by TEFLON® coated screws 205. Plastic is unable to adhere to the TEFLON® coated areas. Consequently, a substantial portion of the base 200 remains uncoated and without plastic. As a result, when the roto mold tool is cooled, a single walled hood or divider having the shape of the mold portion 100 is formed.

The concept of roto molding is well known. Accordingly, the roto mold tool of the present invention may be constructed of any material that has been used in such applications. Non-limiting examples are steel, copper, and aluminum. The most preferred material is aluminum.

The method of the present invention is not limited in application to creating ran open bottom/single walled hood or divider. Instead, TEFLON® may be applied elsewhere on the mold to create holes for whatever reasons are deemed necessary. For example, it may be desirable to create holes through which screws may be inserted.

Of course, it should be understood that a wide range of changes and modifications can be made to the embodiments described above and depicted in the drawings. It is intended, therefore, that the foregoing description illustrates rather than limits this invention, and that it is the following claims, including all equivalents, that define this invention.

We claim:

1. A method of making a hood or divider for use in a row crop head comprising the steps of:

a. providing a rotational molding tool having a surface for forming the hood or divider, the tool comprising an upper portion and a base portion, the upper portion being made of metal and shaped such that it defines the shape of the hood or divider, the surface of the tool being at least partially coated with a non-stick polymer;

b. supplying an amount of plastic into the tool;

c. heating the tool so as to liquefy the plastic;

d. moving the tool in a plurality of directions such that the plastic contacts the surface of the tool to form the hood or divider whereby the liquefied plastic does not adhere to the non-stick polymer thereby creating an open space wherever the surface of the molding tool is coated with the non-stick polymer; and e. removing the hood or divider from the tool.

2. The method of claim 1 wherein the non-stick polymer is selected from the group consisting of: polytetrafluoroethylene, perfluoroalkoxy resins, and ethylene propylene resins.

3. The method of claim 1 wherein the base portion is at least partially coated with the non-stick polymer.

4. The method of claim 1 wherein the base portion is coated with the non-stick polymer so as to form a single-walled hood or divider.

\* \* \* \* \*